US006732020B2

(12) United States Patent
Yamagishi

(10) Patent No.: US 6,732,020 B2
(45) Date of Patent: May 4, 2004

(54) ACCIDENT NOTIFICATION SYSTEM FOR VEHICLE

(75) Inventor: Junichi Yamagishi, c/o Unirec Co., Ltd., 6-3, 2-chome, Kaminarimon, Taito-ku, Tokyo 111-0034 (JP)

(73) Assignees: Unirec Co., Ltd., Tokyo (JP); Junichi Yamagishi, Tokyo (JP)

( * ) Notice: Subject to any disclaimer, the term of this patent is extended or adjusted under 35 U.S.C. 154(b) by 68 days.

(21) Appl. No.: 10/143,217

(22) Filed: May 9, 2002

(65) Prior Publication Data

US 2003/0212475 A1 Nov. 13, 2003

(51) Int. Cl.$^7$ ................................................ B60Q 1/00
(52) U.S. Cl. ........................ 701/1; 701/1; 701/213; 701/207; 340/991; 340/436; 342/457
(58) Field of Search ......................... 701/1, 207, 213, 701/117; 340/991, 997, 436; 342/454, 457

(56) References Cited

U.S. PATENT DOCUMENTS

| | | | | |
|---|---|---|---|---|
| 4,369,426 A | * | 1/1983 | Merkel | 340/904 |
| 4,717,904 A | * | 1/1988 | Murakami | 340/436 |
| 5,223,844 A | * | 6/1993 | Mansell et al. | 342/357.07 |
| 5,311,197 A | * | 5/1994 | Sorden et al. | 342/457 |
| 5,504,482 A | * | 4/1996 | Schreder | 340/995.13 |
| 5,570,087 A | * | 10/1996 | Lemelson | 340/870.05 |
| 5,808,564 A | * | 9/1998 | Simms et al. | 340/990 |
| 5,969,598 A | * | 10/1999 | Kimura | 340/436 |
| 6,310,542 B1 | * | 10/2001 | Gehlot | 340/426.25 |

FOREIGN PATENT DOCUMENTS

| | | | | |
|---|---|---|---|---|
| JP | 09311991 A | * | 12/1997 | G08B/23/00 |
| JP | 11167689 A | * | 6/1999 | G08B/25/10 |
| JP | 2001-266294 | | 9/2001 | |

* cited by examiner

Primary Examiner—William A. Cuchlinski, Jr.
Assistant Examiner—Eric M Gibson
(74) Attorney, Agent, or Firm—Jordan and Hamburg LLP

(57) ABSTRACT

An accident notification system for a vehicle includes a damage predicting system which detects that a vehicle occupant has been injured in an accident involving the vehicle, a vehicle position detecting system which detects the position of the vehicle, and a mobile communication terminal which receives a signal predicting injury to the vehicle occupant from the damage predicting system to generate a calling from the vehicle to a call center. The call center performs a notification to an accident response facility on the basis of the calling and obtains prediction information that the vehicle occupant has been injured from the damage predicting system and vehicle position information detected by the vehicle position detecting system. Accordingly, even when there is no one who notifies an accident response facility of an accident, emergency cleaning-up after an accident and treatment for an injured vehicle occupant can be made.

6 Claims, 5 Drawing Sheets

ACCIDENT NOTIFICATION SYSTEM FOR VEHICLE

BACKGROUND OF THE INVENTION

1. Field of the Invention

The present invention relates an accident notification system for a vehicle where, when a vehicle causes an accident, such an accident can automatically be notified to a related organ.

2. Description of the Related Art

Conventionally, in an express highway or the like, such a system is employed that, when an automobile causes an accident, an occupant of the automobile can notify the accident to a road administrator or the like by a phone provided along the road for each predetermined interval.

Also, in recent years, mobile or portable telephones have been widespread, and when an accident has happened, a vehicle occupant can notify the accident to a police station, an emergency station or another related organ to prompt cleaning the accident.

However, when such a situation occurs that a vehicle has caused an accident alone on a mountain road and a vehicle occupant(s) has been physically damaged to the extent that he/she (they) can not move, there is a risk that a situation that he/she (they) can not use even a portable phone occurs and the accident is left as it is.

Also, when a vehicle has fallen in the sea, there often occurs a case that it is difficult for an occupant to escape from the vehicle by his/her own force. In the case, a risk that the accident is left as it is becomes above.

SUMMARY OF THE INVENTION

The present invention provides an accident notification system for a vehicle, capable of notification of position information on an accident when the accident that an occupant is damaged has happened.

A first aspect of the present invention is an accident notification system for a vehicle comprising: damage predicting means which predicts that a vehicle occupant has been damaged by an accident of a vehicle; vehicle position detecting means which detects the position of the vehicle; and a mobile communication terminal which receives a signal indicating that the damage predicting means has predicted the damage of the vehicle occupant to generate a calling to a call center. The call center performs a notification to a related organ on the basis of the calling and the related organ obtains prediction information that the vehicle occupant has been damaged from the damage predicting means and vehicle position information which has been detected by the vehicle position detecting means.

According to the first aspect of the invention, it can be predicted by the damage predicting means that a vehicle occupant has been damaged by an accident of a vehicle. The position of the vehicle can be detected by the vehicle position detecting means. The mobile communication terminal receives a signal indicating that the damage predicting means has predicted the damage of the vehicle occupant so that it can generate a calling to a call center from the vehicle side. The call center performs a notification to a related organ on the basis of the calling, and the related organ can obtain prediction information that the vehicle occupant has been damaged from the damage predicting means and vehicle position information which has been detected by the vehicle position detecting means.

Accordingly, a staff member of the related organ can reach the accident vehicle where the vehicle occupant has been damaged urgently. Emergent cleaning-up after accident and treatment for the damaged vehicle occupant can be performed accurately even in a situation that the vehicle occupant has been damaged to the extent that he/she can not move.

A second aspect of the invention is an accident notification system for a vehicle according to the first aspect, wherein the call center is provided with a user database where personal information has been registered in advance and a map database where map information has been stored. Registered personal information and position of the vehicle are retrieved from the user database and the map database on the basis of the calling from the mobile communication terminal. Prediction information that the retrieved person has been damaged, the personal information about the retrieved person and the vehicle position information about the retrieved position of the vehicle notified to the related organ.

According to the second aspect of the invention, in addition to the effect obtained by the first aspect, the call center is provided with a user database where personal information has been registered in advance and a map database where map information has been stored. Therefore, the registered personal information and position of the vehicle can be retrieved from the user database and the map database on the basis of the calling from the mobile communication terminal. The prediction information indicating that the retrieved vehicle occupant has been damaged and the vehicle position information about the retrieved position of the vehicle can be notified to the related organ.

Accordingly, the related organ can identify the person who has caused the accident and the place of the accident immediately, and emergent clearing-up after accident and treatment for the vehicle occupant can be performed precisely. Also, accident information can be notified to a related person(s) such as a family or the like immediately.

A third aspect of the invention is an accident notification system for a vehicle according to the first or second aspect, wherein the damage predicting means is provided with an acceleration sensor which detects an acceleration due to a collision of the vehicle. The damage predicting means predicts that the vehicle occupant has been damaged when the acceleration detected by the acceleration sensor exceeds a reference acceleration.

According to the third aspect, in addition to the effect achieved in the first or second aspect, the damage predicting means is provided with the acceleration sensor which detects an acceleration due to a collision of the vehicle. The damage predicting means can predict that the vehicle occupant has been damaged when the acceleration exceeds the reference acceleration. Therefore, the fact that the vehicle occupant has been damaged can accurately be predicted so that a staff member(s) of the related organ can be performed an accurate cleaning-up after accident urgently.

A fourth aspect of the invention is an accident notification system for a vehicle according to the first or second aspect, wherein the vehicle is provided with an extendable antenna which allows a calling of the mobile communication terminal. A distal end portion of the antenna is attached to a float which is releasably supported to the vehicle. The float comes up to the surface of the water when the vehicle has sunk in the water so that the distal end of the antenna is exposed on the water surface.

According to the fourth aspect of the invention, in addition to the effect achieved by the first or second aspect, the extendable antenna which allows a calling of the mobile communication terminal is provided to the vehicle, the distal end of the antenna attached to the float. Therefore, when the vehicle has sunk in the water, the distal end of the antenna comes up to the surface of the water so that the distal end of the antenna can be exposed on the surface of the water.

Accordingly, even in a case that a vehicle has fallen in the sea to sink therein and a vehicle occupant(s) has been confined in the compartment of the vehicle, a calling can be generated by the mobile communication terminal so that an emergent cleaning-up for accident can be performed accurately.

DESCRIPTION OF THE PREFERRED EMBODIMENTS

Figure 1:
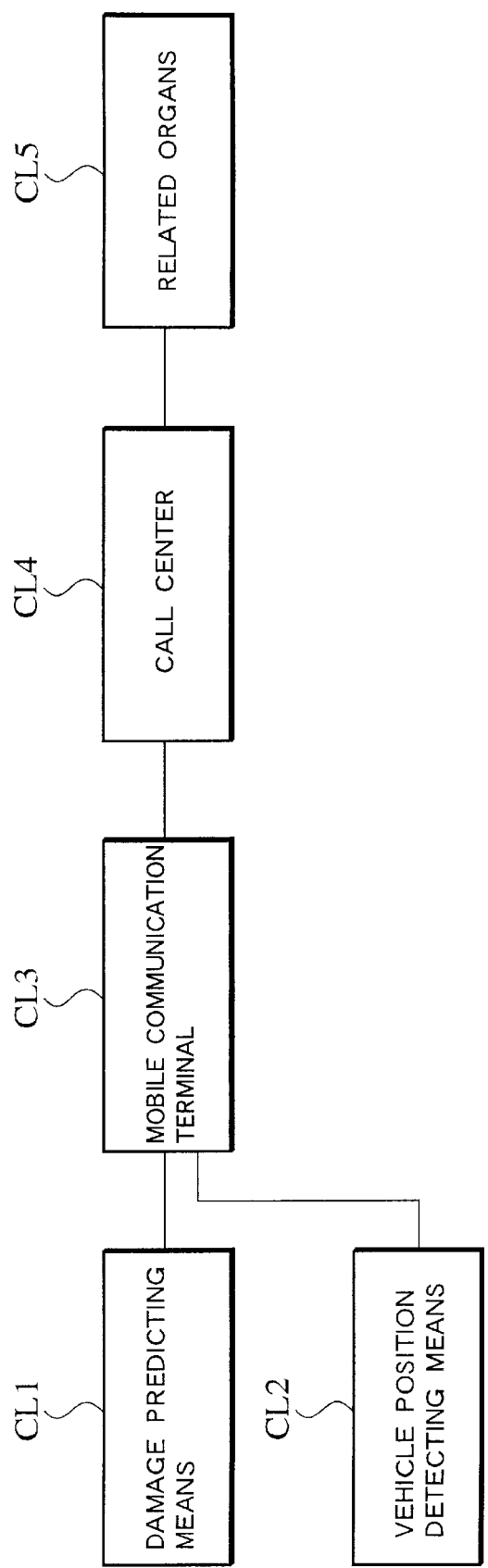
FIG. 1 is a block diagram showing a configuration of the present invention.

FIG. 1 is a configuration diagram showing the present invention. An accident notification system for a vehicle is provided with damage predicting means CL1, vehicle position detecting means CL2, and a mobile communication terminal CL3.

The damage predicting means CL1 is for predicting that a vehicle occupant has been damaged such as injury of the vehicle occupant due to an accident of a vehicle. The vehicle position detecting means CL2 is for detecting the position of the vehicle. The mobile communication terminal CL3 is for receiving a signal indicating that the damage predicting means CL1 has predicted a damage of a vehicle occupant to generate a calling to a call center CL4 from the vehicle side. The call center CL 4 issues a notification to a related organ(s) CL5 on the basis of the calling, and the related organ CL5 obtains prediction information indicating that the vehicle occupant has been damaged from the damage predicting means CL1 and vehicle position information from the vehicle position detecting means CL2. Then, a staff member(s) of the related organ CL5 can reach the spot of the accident urgently on the basis of the prediction information predicting that the vehicle occupant has been damaged and the vehicle position information.

Figure 2:
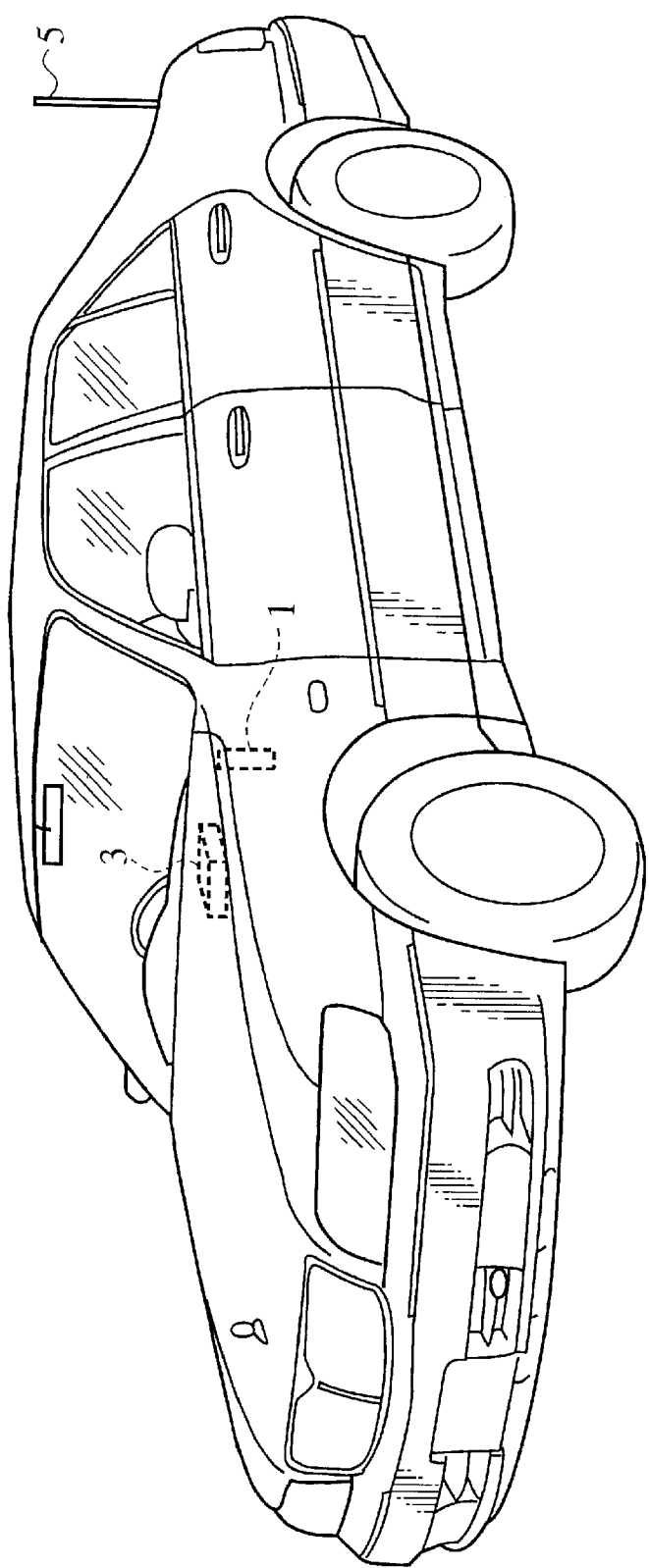
FIG. 2 is a perspective view of a vehicle to which one embodiment of the present invention has been applied.

FIG. 2 is a perspective view of a vehicle to which one embodiment of the present invention has been applied. As shown in FIG. 2, the vehicle is provided with an acceleration sensor 1 serving as damage predicting means, and a detection value obtained by the acceleration sensor 1 is inputted into a microcomputer 3. The vehicle is provided with a GPS antenna 5 of a GPS unit described later. A GPS signal is inputted into the microcomputer 3 through the GPS antenna 5.

Figure 3:
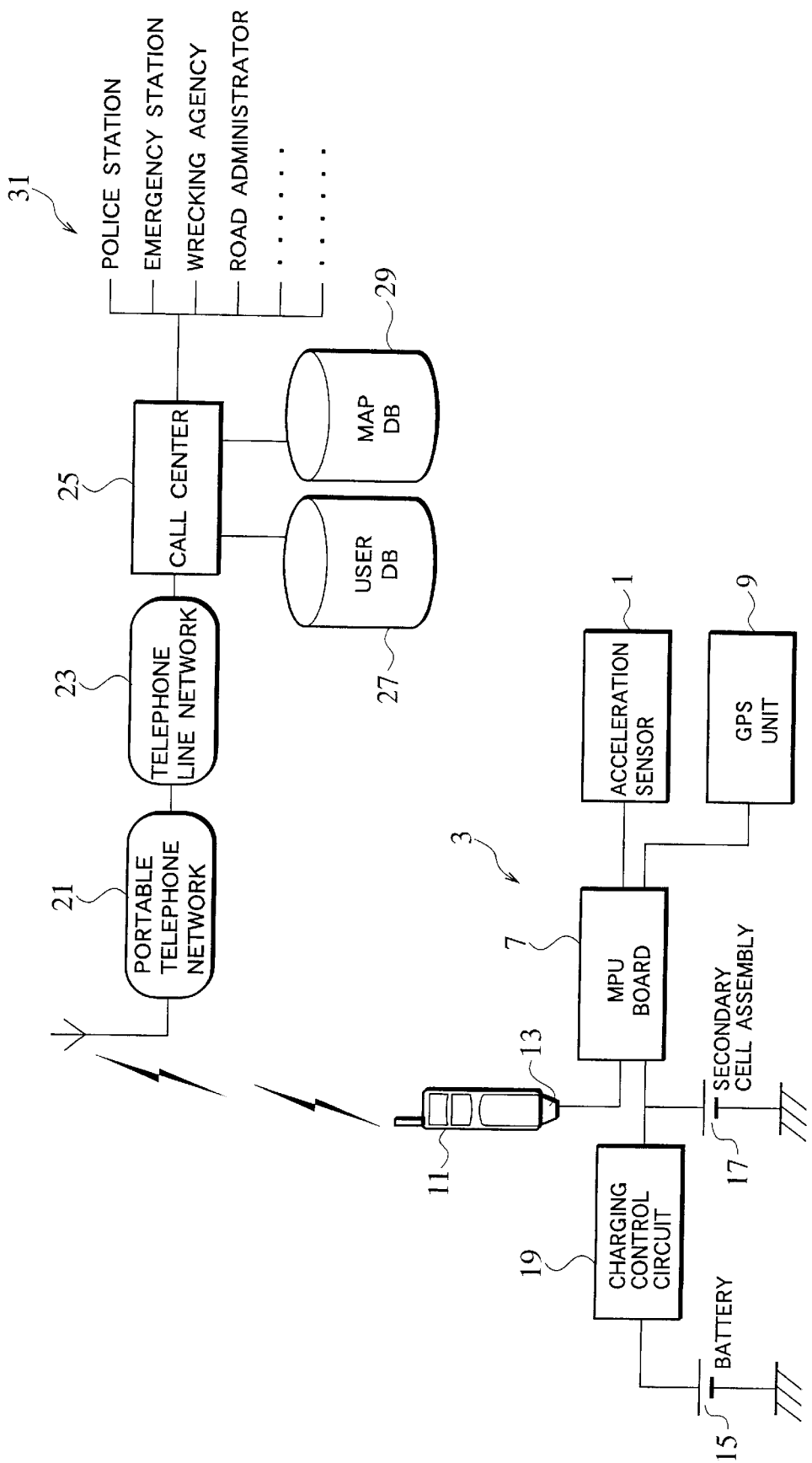
FIG. 3 is a block diagram showing one embodiment of the present invention.

FIG. 3 is a block diagram of an accident notification system for a vehicle of the present embodiment. The microcomputer 3 is provided with an MPU board 7. The acceleration sensor 1 and the GPS unit 9 are connected to an input side of the MPU board 7.

The acceleration sensor 1 is for detecting an acceleration of the vehicle to input the same into MPU board 7. The GPS unit 9 is for inputting a position signal of the vehicle into the MPU board 7 according to a signal inputted from the GPS antenna 5.

A mobile communication terminal, for example, a portable telephone 11, is attachably/detachably connected to an output side of the MPU board 7 through a connector 13. Incidentally, the portable telephone 11 can be caused to communicate with the MPU board 7 utilizing a wireless system of fine SS (split spread spectrum) radio wave. The wireless system of fine SS radio wave is spreading as a Blue tooth. Also, instead of the portable telephone 11, a PHS or the like can be used as the mobile communication terminal. Further, besides the portable telephone and the PHS, the mobile communication terminal may be constituted with a communication terminal fixed to the vehicle.

The MPU board 7 is connected with a vehicle battery 15 and a secondary battery 17 serving as a power source. The secondary battery 17 is structured so as to be charged by a generator provided with the vehicle, a regenerative braking system, a solar cell assembly or the like through a charging control circuit 19. Therefore, even when the battery 15 is put in an unusable state due to an accident, a power is supplied from the secondary battery 17 to the MPU board 7, thereby allowing an operation of the MPU board 7.

A calling from the portable telephone 11 is received by a call center 25 via a portable telephone network 21 and a telephone line network 23. The call center 25 is provided with a user database (DB) 27 and a map database 29. The call center 25 receives a vehicle position signal transmitted together with the calling from the portable phone 11. Then, personal information is retrieved from the user database 27 on the basis of the calling, and the position of the vehicle is retrieved from the map database 29 on the basis of the vehicle position signal. Stored or registered in the user database 29 as the personal information are address, the name, the age, the home telephone number, the blood type and the like of each user. Map information is stored in the map database 29.

Prediction information that a user has been damaged, the personal information about the user and the vehicle position information about the vehicle of the user are notified as retrieval results from the call center 25 to related organs 31. As the related organs 31, for example, a police station, a emergency station, a wrecking agency, a road manager or the like are considered.

Figure 4:
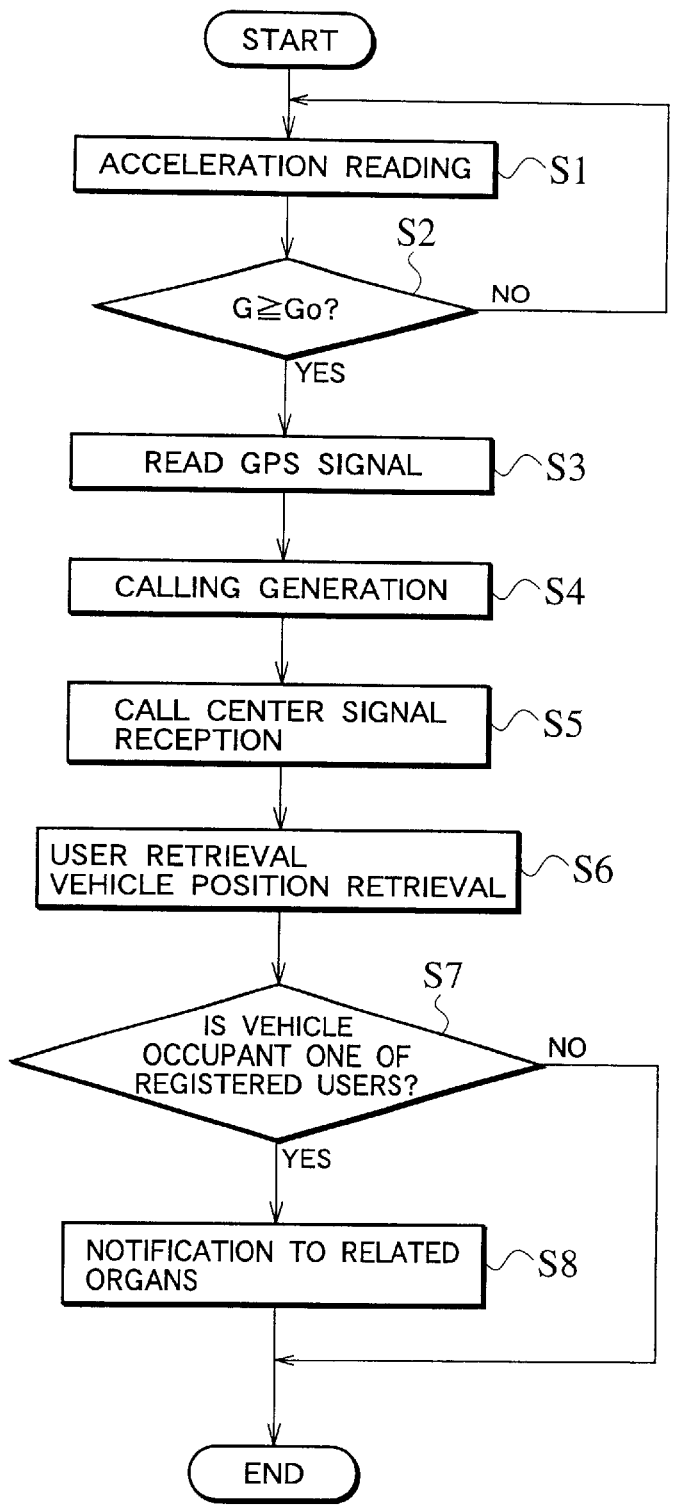
FIG. 4 is a flowchart showing the embodiment.

FIG. 4 is a flowchart showing an operation of the embodiment. The operation of the embodiment will be explained with reference to a flowchart shown in FIG. 4. First, in Step S1, processing for reading an acceleration is performed. The acceleration detected by the acceleration sensor 1 is a minus acceleration of the vehicle decelerated when an accident has happened, namely, a deceleration G of a vehicle. A detection signal of the acceleration sensor 1 is read by the MPU board 7 and the control proceeds to Step S2. In Step S2, whether or not the deceleration G of the vehicle exceeds a predetermined set value Go is determined according to a processing for determining whether or not $G \geq Go$. The set value Go is a predetermined reference deceleration. This reference deceleration has such a value that when an actual deceleration exceeds the reference deceleration, a vehicle occupant may be damaged to the extent that he/she can not move due to an injury. Therefore, in the case of $G \geq Go$, the control proceeds to Step S3, but a processing for reading an acceleration in Step 1 is performed, again, in a case of $G < Go$.

In Step S3, a processing for reading a GPS signal is performed. In the Step S3, reading of a vehicle position signal is performed according to the signal inputted from the GPS unit 9 and the control proceeds to Step S4.

In Step S4, a processing for a calling is performed and the control proceeds to Step S5. In Step S5, a processing for a call center signal reception is performed, and a signal reception in call center 25 is performed and the control proceeds to Step S6.

In Step S6, a processing for a user retrieval and a vehicle position retrieval is performed. In the Step S6, registered personal information such as the name and address of a user or the like, and the vehicle position information are retrieved from the user database 27 and the map database 29 and the control proceeds to Step S7.

In Step S7, a processing for determining whether or not the user is one of the registered users is performed. When the registration has not found in the user retrieval, the processing is terminated. When the user is one of the registered users, the control proceeds to Step S8, where a notification to the related organ(s) is performed. In Step S8, the notification is performed from the call center 25 to a police station, an emergency station, a wrecking agency, a road administrator or the like which serves as the related organs 31. The notification includes the prediction information predicting that the retrieved person or user has been damaged, the personal information such as the address, name and the blood type of the retrieved person or the like, and the vehicle position information about the place where the vehicle of the retrieved person has caused the accident.

Thus, according to the present embodiment, even in a situation where, when a vehicle has caused an accident, a vehicle occupant has been damaged to the extent that he/she can not move, the prediction information predicting that the vehicle occupant has been damaged, the personal information and the vehicle position information are automatically notified to the related organ(s) 31 such as a police station, an emergency station or the like so that a staff member(s) of the related organ(s) 31 can reach the accident site immediately. In particular, in such a case that a vehicle has caused a falling-off alone accident on a mountain road or the like, there often occurs a case where a vehicle occupant has been damaged to an extent that he/she can not move and can not issue even any notification. However, since information is automatically notified to the related organ(s) 31 in the above manner, a staff member(s) of the related organ(s) 31 can reach the accident site immediately. Accordingly, cleaning-up of the accident site and treatment of the vehicle occupant can be performed rapidly and accurately.

Also, since a signal is generated by using the portable telephone 11 or the like, the embodiment can be configured inexpensively.

Incidentally, such a configuration can be employed that the degree of the damage of the vehicle occupant is approximately estimated according to the magnitude of the acceleration which has been detected by the acceleration sensor 1 and it is notified as information.

Figure 5:
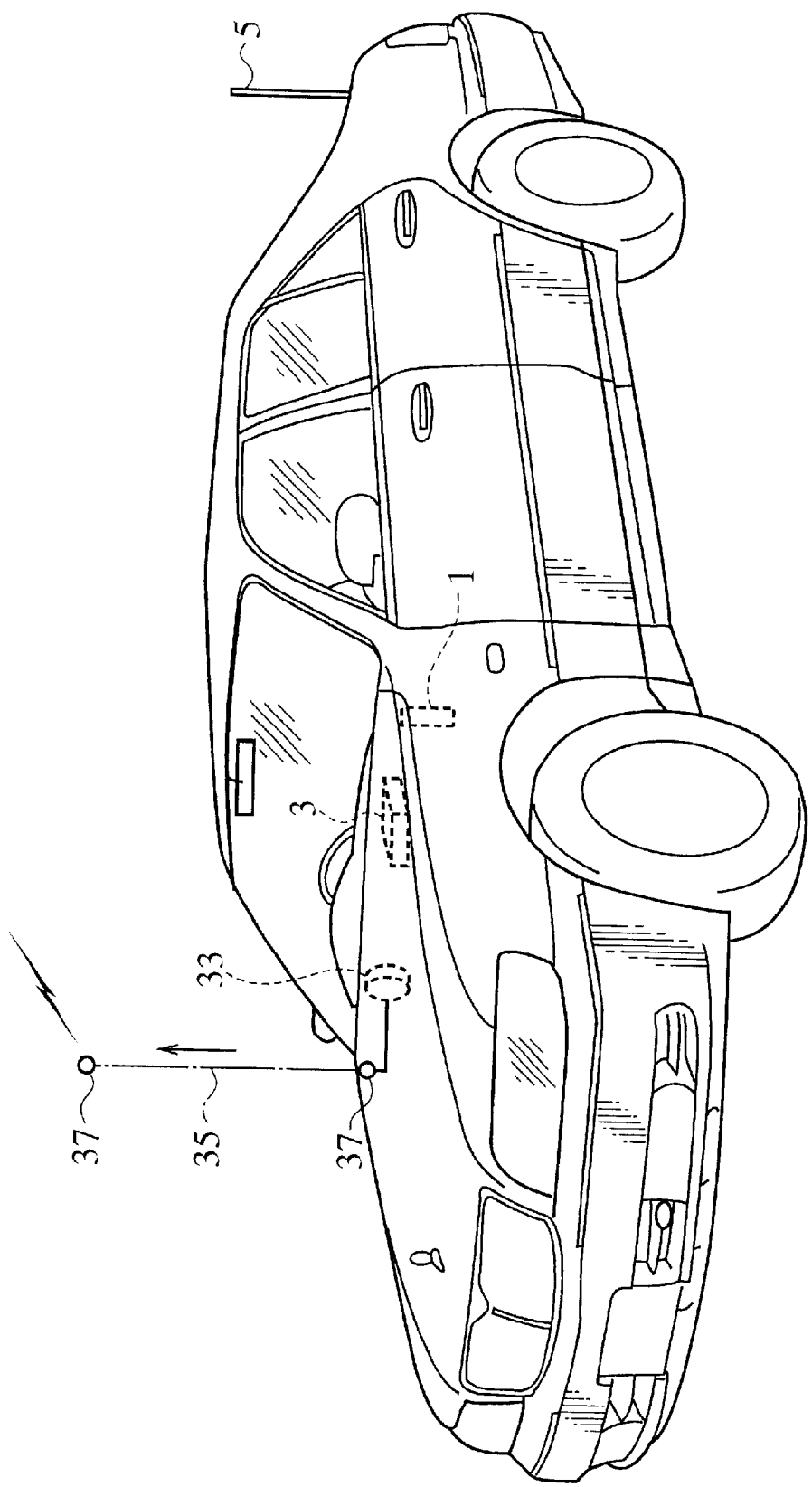
FIG. 5 is a perspective view of a vehicle according to another embodiment.

FIG. 5 shows another embodiment of the present invention. A basic configuration of this embodiment is similar to that in the above embodiment.

Meanwhile in this embodiment, a communication terminal 33 serving as a mobile communication terminal is provided in a vehicle in a fixed manner. An extendable antenna 35 which allows a calling from the communication terminal 33 is provided on the vehicle. A float 37 which is releasably supported to the vehicle is provided at a distal end of the antenna 35. In an ordinary situation of the vehicle, the float 37 is stored in a surface portion of the body of the vehicle, and the antenna 35 is stored in the inward surface of the body of the vehicle. When the vehicle has fallen and sunk in the sea, for example, the float 37 which has been stored in the surface portion of the vehicle comes up to the surface of the sea due to a floating force; as a result, the distal end of the antenna 35 is exposed on the sea surface. In this embodiment, since the float 37 itself serves as an antenna, the exposure of the float 37 on the sea surface substantially means exposure of the distal end of the antenna on the sea surface.

With such a configuration, even when a vehicle has been sunk in the sea, a calling from the communication terminal 33 can be performed. In the case of this embodiment, the damage predicting means is configured with a switch which detects the fact that the antenna 35 has been drawn out due to a floating force. And a calling is generated from the communication terminal 33 via the antenna 35 by turning-on of the switch. Such a case includes a case that the vehicle occupant has been confined in the vehicle but he/she himself/herself has not been injured so much to such an extent that he/she has been damaged. However, when such a situation is left as it is, water enters into the interior of the vehicle so that the occupant may be damaged by entered water. In such a case, the switch which detects that the antenna 35 has been drawn out serves as the damage predicting means.

In this embodiment, thus, a notification due to that the vehicle has fallen in the sea can be performed like the above, and emergent cleaning-up after accident and treatment for the occupant can be accurately performed. Incidentally, in the above embodiment, such a configuration is employed that the retrieval of a vehicle position is performed according to a signal of the GPS unit 9, but the retrieval can be performed using a signal of a PHS or a SS radio wave system.

In the above embodiments, such a configuration is employed that a calling is received in the call center 25 where retrievals are performed using the user database 27 and the map database 29, but such a configuration can be employed without providing any call center. In this case, any one or respective ones of the related organs 31 are provided with the user database 27 and the map database 29. A calling from an accident vehicle side is directly received in each related organ where retrieval of personal information and retrieval of map information are performed, and a staff member(s) of each related organ rushes to the accident site. In this case, it is possible to perform the above-described cleaning-up after accident and treatment for an occupant to all persons without determination about whether or not an occupant in an accident vehicle is one of the registered users.

As the damage predicting means, a yaw rate sensor which detects a yaw rate of a vehicle, a pressure sensor or a contact sensor which is provided in an engine room of a vehicle or the like can be used. The pressure sensor or the contact sensor can detect a crushed state of a vehicle exceeding a predetermined level or the like.

What is claimed is:

1. A vehicle comprising:
   an accident notification system comprising:
   damage predicting means for predicting that a vehicle occupant has been injured in an accident involving the vehicle;
   vehicle position detecting means for detecting the position of the vehicle; and
   a mobile communication terminal which receives a signal indicating that the damage predicting means has predicted the injury to the vehicle occupant to generate a calling to a call center from the vehicle, an extendable antenna coupled to the mobile communication terminal; and a float releasably supported on the vehicle, a distal end of the antenna being attached to the float such that when the vehicle is situated underwater, the float rises toward a water surface and the distal end of the antenna may be exposed on the water surface, and wherein the call center performs a notification to an accident response facility on the basis of the calling and the accident response facility obtains prediction information that the vehicle occupant has been injured from the damage predicting means and vehicle position information detected by the vehicle position detecting means on the basis of the calling.

2. A vehicle according to claim 1, wherein the call center is provided with a user database wherein personal information has been registered in advance and a map database wherein map information has been stored, registered personal information and position of the vehicle being retrieved from the user database and the map database on the basis of the calling from the mobile communication terminal, and the prediction information when the retrieved person has been injured, the personal information about the retrieved person and the vehicle position information about the retrieved position of the vehicle being provided to the accident response facility.

3. A vehicle according to claim 2, wherein the damage predicting means includes an acceleration sensor which detects an acceleration due to a collision of the vehicle, and the damage predicting means predicts that the vehicle occupant has been injured when the detected acceleration exceeds a predetermined reference acceleration.

4. A vehicle according to claim 1, wherein the damage predicting means includes an acceleration sensor which detects an acceleration due to a collision of the vehicle, and the damage predicting means predicts that the vehicle occupant has been injured when the detected acceleration exceeds a predetermined reference acceleration.

5. A vehicle according to claim 1, wherein the float is stored in a surface portion of a body of the vehicle.

6. A vehicle according to claim 1, wherein the antenna is stored in an inward surface of a body of the vehicle.

* * * * *